US010515126B2

(12) United States Patent
Kurian et al.

(10) Patent No.: US 10,515,126 B2
(45) Date of Patent: *Dec. 24, 2019

(54) REVERSIBLE REDACTION AND TOKENIZATION COMPUTING SYSTEM

(71) Applicant: Bank of America Corporation, Charlotte, NC (US)

(72) Inventors: Manu Kurian, Dallas, TX (US); Sorin N. Cismas, Southlake, TX (US); Paul Roscoe, Treuddyn Flintshire (GB); Jeffrey McGonnell, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,383

(22) Filed: Apr. 3, 2018

(65) Prior Publication Data

US 2018/0232532 A1 Aug. 16, 2018

Related U.S. Application Data

(63) Continuation of application No. 14/950,779, filed on Nov. 24, 2015, now Pat. No. 10,140,296.

(51) Int. Cl.
*G06F 21/62* (2013.01)
*G06F 16/93* (2019.01)
(Continued)

(52) U.S. Cl.
CPC ............ *G06F 16/93* (2019.01); *G06F 21/604* (2013.01); *G06F 21/6218* (2013.01); *G06F 21/6254* (2013.01)

(58) Field of Classification Search
None
See application file for complete search history.

(56) References Cited

U.S. PATENT DOCUMENTS 7,913,167 B2   3/2011   Cottrille
8,776,249 B1*  7/2014   Margolin ............ G06F 21/606
                                                380/277
(Continued)

FOREIGN PATENT DOCUMENTS

WO   2011/059510 A1   5/2011

OTHER PUBLICATIONS

WO 2012127797. English Translation. Panasonic. (Year: 2012).*
(Continued)

*Primary Examiner* — Venkat Perungavoor
(74) *Attorney, Agent, or Firm* — Banner & Witcoff, Ltd.; Michael A. Springs

(57) ABSTRACT

A computing system for redacting and/or tokenizing non-public information of electronic documents stored in a database may include a data redaction computing device and/or a data tokenization computing device, a first database storing a plurality of electronic documents, and a second database storing computer executable instructions for analyzing information associated with the plurality of electronic documents stored in the first database. The computer executable instructions may cause the data redaction/tokenization computing device to identify non-public information in one or more of the plurality of electronic documents and/or at least one of a document type, a source of the electronic document, and a destination to which the electronic document is to be communicated. Based on this analysis, the data redaction/tokenization computing device may modify the electronic document to redact and/or tokenize the non-public information based on the computer executable instructions retrieved from the second database.

20 Claims, 2 Drawing Sheets

(51) Int. Cl.
*G06F 21/60* (2013.01)
*G06F 17/30* (2006.01)

(56) References Cited

U.S. PATENT DOCUMENTS

| | | | |
|---|---|---|---|
| 9,104,659 B2* | 8/2015 | Treadwell | G06F 17/24 |
| 9,195,808 B1* | 11/2015 | Nestler | G06F 12/14 |
| 2004/0128555 A1* | 7/2004 | Saitoh | H04N 1/44 |
| | | | 726/16 |
| 2004/0133849 A1 | 7/2004 | Goger | |
| 2005/0114672 A1 | 5/2005 | Duncan et al. | |
| 2006/0120526 A1* | 6/2006 | Boucher | G06F 21/6218 |
| | | | 380/247 |
| 2007/0094594 A1 | 4/2007 | Matichuk et al. | |
| 2007/0208743 A1 | 9/2007 | Sainaney | |
| 2009/0089663 A1 | 4/2009 | Rebstock et al. | |
| 2010/0058077 A1* | 3/2010 | Matsuda | G06F 21/78 |
| | | | 713/194 |
| 2010/0241844 A1 | 9/2010 | Hussain et al. | |
| 2011/0040983 A1* | 2/2011 | Grzymala-Busse | |
| | | | G06F 21/6245 |
| | | | 713/189 |
| 2011/0219424 A1* | 9/2011 | Panasyuk | G06F 21/606 |
| | | | 726/1 |
| 2013/0104190 A1* | 4/2013 | Simske | G06F 21/60 |
| | | | 726/1 |
| 2013/0110748 A1* | 5/2013 | Talati | G06F 17/274 |
| | | | 706/12 |
| 2013/0144901 A1 | 6/2013 | Ho et al. | |
| 2014/0007246 A1* | 1/2014 | Nelson | H04L 63/12 |
| | | | 726/26 |
| 2014/0108793 A1 | 4/2014 | Barton et al. | |
| 2014/0282872 A1 | 9/2014 | Hansen et al. | |
| 2014/0283089 A1 | 9/2014 | Arya | |
| 2015/0106946 A1* | 4/2015 | Soman | G06F 21/602 |
| | | | 726/26 |
| 2015/0172294 A1* | 6/2015 | Bittner | G06F 16/00 |
| | | | 726/4 |

OTHER PUBLICATIONS

CN 102819604. English Translation. Tiang Xu (Year: 2012).*
Masking Gateway for Enterprises, Porat, Sara et al., Springer-Verlag (2009).

* cited by examiner

REVERSIBLE REDACTION AND TOKENIZATION COMPUTING SYSTEM

CROSS REFERENCE TO RELATED APPLICATIONS

This application is a continuation of U.S. patent application Ser. No. 14/950,779 and is related to U.S. patent application Ser. No.: 14/950,790 now U.S. Pat. No. 9,767,307, both entitled "REVERSIBLE REDACTION AND TOKENIZATION COMPUTING SYSTEM", both of which are hereby incorporated by reference in their entirety.

BACKGROUND

A business organization may process large amounts of data (e.g., images, documents, and the like) stored in one or more databases, such as text documents, presentations, images, webpages, communications (e.g., emails, letters, catalogs, and the like), to name a few. In many cases, the data stored in the one or more databases may include private, or otherwise non-public information. However, the stored information (e.g., the documents, presentations, images, webpages, communications, and the like) may be shared in the performance of one or more business functions without sharing the private or non-public information with individuals, business organizations, governmental agencies, and the like, that are not authorized to receive such information. Processing this information may tie up a large percentage of the business organization's available computing power and/or may involve storing large amounts of data while identifying the non-public information. As such, a need has been recognized to more efficiently transform original documents into reversible tokenized and/or redacted documents to prevent a data leakage event.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, a computing system for redacting and/or tokenizing non-public information of electronic documents stored in a database may include a data redaction computing device and/or a data tokenization computing device, a first database storing a plurality of electronic documents, and a second database storing computer executable instructions for analyzing information associated with the plurality of electronic documents stored in the first database. The computer executable instructions may cause the data redaction/tokenization computing device to identify non-public information in one or more of the plurality of electronic documents and/or at least one of a document type, a source of the electronic document, and a destination to which the electronic document is to be communicated. Based on this analysis, the data redaction/tokenization computing device may modify the electronic document to redact and/or tokenize the non-public information based on the computer executable instructions retrieved from the second database.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
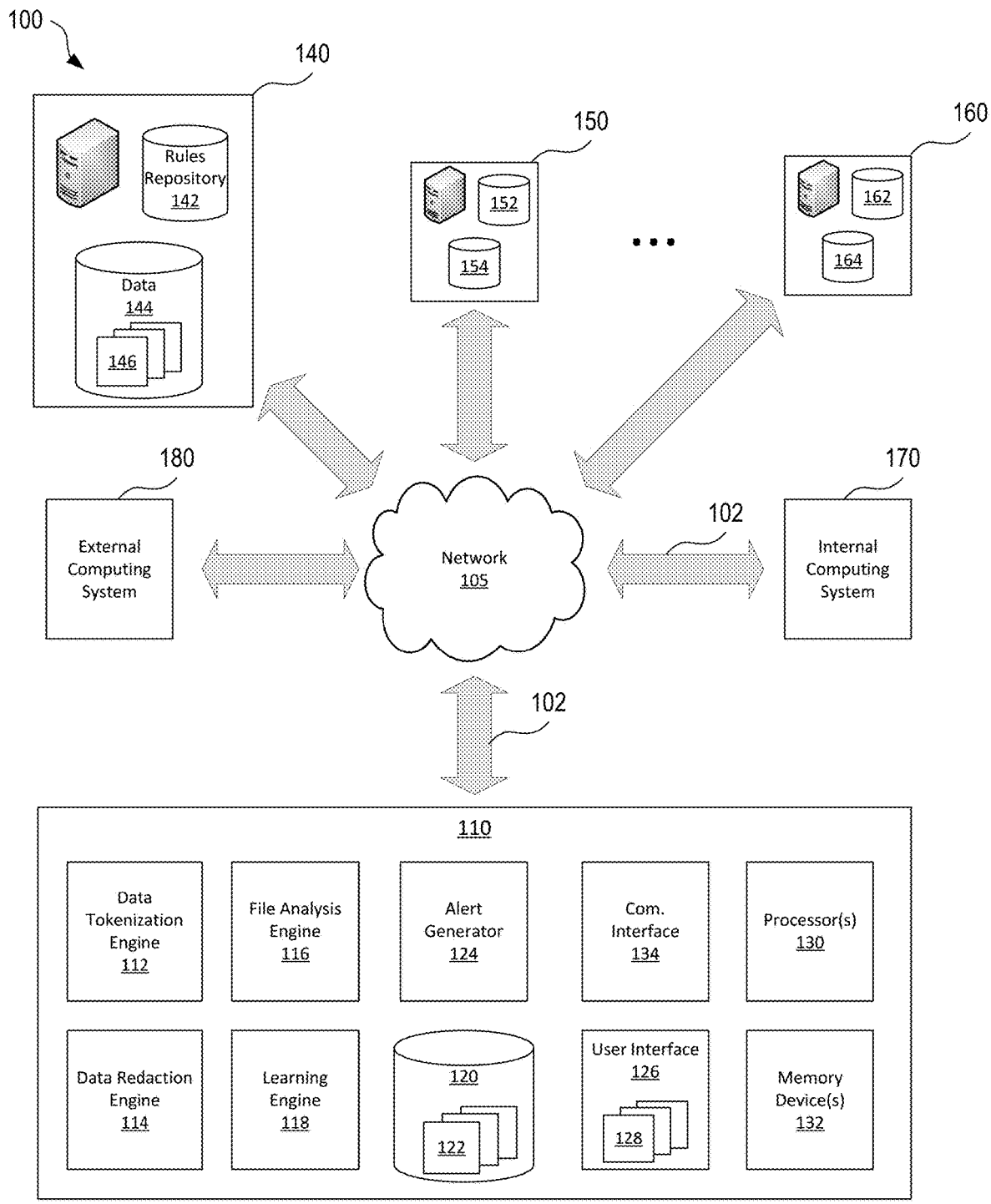
FIG. 1 shows an illustrative networked computing system including a reversible data redaction and/or tokenization computing system, according to one or more aspects of the present disclosure.

FIG. 1 shows an illustrative networked computing system 100 including a reversible data redaction and/or tokenization computing system 110, according to one or more aspects of the present disclosure. The reversible data redaction and/or tokenization computing system 110 may include a data tokenization engine 112, a data redaction engine 114, a file analysis engine 116, a learning engine 118, a rules data repository 120 (e.g., a rules database), an alert generator 124, a user interface 126, a non-transitory memory device storing one or more user interface screens 128, one or more processors 130, one or more memory devices 132, and/or a communication interface 134. The communication interface 135 may facilitate communication between the reversible data redaction and/or tokenization computing system 110 via a network 105 using one or more wired or wireless communication links 102. The reversible data redaction and/or tokenization computing system 110 may communicate, via the one or more wired or wireless communication links 102 over the network 105, with one or more internal computing systems 140, 150, 160, 170 and/or external computing systems (e.g., the external computing system 180). In some cases, the reversible data redaction and/or tokenization computing system may be implemented using a special purpose computing device (or computing devices) that have been specially programmed to perform functionality according to one or more aspects of the present disclosure In some cases, the business organization may utilize one or more computing systems in the course of business. For example, one or more of the internal computing systems 140, 150, 160, and 170 may be associated with one or more business units of the business organization. These computing systems may include one or more computer servers implementing databases and other data storage media that is configured to store data associated with the operations of the business units, such as documents and/or images. For example, the business unit computing systems 140, 150, and 160 may include document databases 144, 154, and 164 storing information (e.g., documents, images, and the like) corresponding to the operations of the corresponding business unit. Such information may be referred to as "documents", such as documents 145, however this term may include such information as text documents, spreadsheets, presentation slide decks, images, communications such as emails, letters, and/or the like. Because the operations of each business unit may differ, the permissions associated with accessing these documents 145 stored in the document databases 144, 154, 164 may also be dependent on one or more business rules, government regulations and/or the like. As such, when data is shared between individuals, either within the same business unit and/or outside of the particular business unit, certain non-public and/or private information included in the documents may be required to be hidden, either by tokenization and/or redaction. For example, the rules repository databases 142, 152, and 162 may store information, such as business rules, government regulations, and the like, that is configured to alter, hide, summarize, or otherwise obfuscate information that is deemed to be non-public or private according to the operations of the particular business unit. Often, this tokenization and/or redaction may be selectively reversed so that the information may be viewed as originally viewed within the document. While FIG. 1 shows that the rules repository databases 142, 152, and 162 are implemented in different computing systems remote from the reversible data redaction and/or tokenization computing system 110, one or more portions of these rules repository databases may be incorporated into the reversible data redaction and/or tokenization computing system 110.

In an illustrative example, the rules repository database 142 may store computer executable instructions for hiding, altering or otherwise obfuscating personal information of the documents 145 stored in the document database 144 when the documents 145 are communicated over the network 105 to one or more computing networks internal to the business organization (e.g., the internal computing system 170) or to one or more computing network external to the business organization (e.g., the external computing system). In some cases, the rules repository database 142 may include computer executable instructions for implementing one or more business rules for enforcing permissions for individuals within the same business unit with regards to certain non-public information. Such non-public information may include, but not be limited to, personal identification information, such as names, addresses, phone numbers, employer information, family information (e.g., spouse name, spouse age, a number of children, children's names, children's ages, images of each family members, and the like), demographic information, health information (e.g., medical records, and the like), personal preference information (e.g., a preferred or trusted method of contacting the individual, and the like), and/or other such information. In some cases, the non-public information may include, but not limited to, financial information, such as credit history information, financial account information (e.g., an account number, an account balance, a financial institution associated with one or more accounts, an account password, and the like), a financial advisor name, direct deposit information, employment information (e.g., an employer name, an employer address, employer phone number, a length of employment, and employment status, and the like). In some cases, the non-public information may include, but not be limited to, the operation of the business, such as business strategy information, a sales lead list, a customer list, a supplier list, pricing lists, inventory information, manufacturing information, an organizational chart, and/or the like.

In some cases, the rules repository databases 142, 152, and 162 may store computer executable instructions to cause a computing device (e.g., the data redaction engine 114, the data tokenization engine 112, and the like) to analyze a particular document to ensure that the data may be obfuscated (e.g., tokenized, redacted, and the like) based on the data itself (e.g., personal information, financial information, business information and/or the like), an intended recipient of the particular document, and/or the source of the particular document. For example, a document shared between individuals within the same business unit may have different permissions to view the non-public information than an individual in a different business unit of the same business organization, which in turn, may be different than the permissions granted to an individual external to the business organization. In addition, a level of employment may also be taken into account by the business rules stored in the rule repository databases 142, 152, and 162. For example, a manager may be allowed to view more or different information (e.g., complete names, complete addresses, and/or the like) than a supervisor who, in turn, may have different permissions (e.g., partial names, partial addresses, and the like) than their employees (e.g., names and addresses are redacted). In some cases, the permissions may differ based on a particular outside organization associated with the particular individual who may receive the particular document. For example, an employee of the Security Exchange Commission (SEC) may have different permissions to certain non-public information that may be included in documents than an employee at the Internal Revenue Service (IRS).

In some cases, the reversible data redaction and/or tokenization computing system 110 may be implemented at a central location and be utilized by one or more different business units and/or business organizations to redact, tokenize or otherwise obfuscate information in a document. In some cases, at least a portion of the reversible data redaction and/or tokenization computing system 110 may be incorporated into the computing systems associated with a particular business unit (e.g., the computing systems 140, 150, 160, and/or 170). In an illustrative example, an instance of the reversible data redaction and/or tokenization computing system 110 may be incorporated into the computing system 140, while the computing systems 150 and 160 may utilize a remote installation of the reversible data redaction and/or tokenization computing system 110 via the network 105. By doing so, the business organization may enable efficient use of the computing system components and allow for more efficient processing of the documents to be redacted, tokenized or otherwise obfuscated.

The reversible data redaction and/or tokenization computing system 110 may include one or more computer devices that may be communicatively coupled to a network 105. The network 105 may be communicatively coupled to one or more devices, such as to servers, at one or more facilities associated with one or more business units of the business organization and/or one or more organizations (e.g., business organizations, educational institutions, governmental agencies, and the like) external to the business organization. The network 105 may include one or more wired and/or wireless networks, such as a telecommunications network (e.g., a cellular network, a land line network, a cable network, and the like), a Wi-Fi network, a local area network (LAN), a wide area network (WAN), the Internet, and the like.

In the illustrative embodiment of FIG. 1, the reversible data redaction and/or tokenization computing system 110 may include one or more processors (e.g. microprocessor, microcontroller, and the like) 130, one or more memory devices 132, a communication interface 134, one or more inputs and/or output devices (I/O), and a user interface 126. The one or more processors 130 may operate by using an algorithm that facilitates the analysis of one or more electronic documents by computer executable instructions implementing business rules for the redaction, tokenization or other obfuscation of information associated with the electronic documents. This algorithm may be included as instructions stored in one or more of the memory devices 132 and may be included as a portion of the data tokenization engine, the 112, the data redaction engine 114, the file analysis engine 116, the learning engine 118, and/or the alert generator 124. The one or more processors 130, for example, operate by receiving an electronic document, or a link to the electronic document, analyzing information associated with the electronic document based one or more rules stored in rules repository databases 142, 152, and/or 162, and generating a redacted and/or tokenized document for communication to an intended recipient.

In an example, the one or more processors 130 may be configured to operate the algorithm and/or the data redaction engine 114, the file analysis engine 116, the learning engine 118, and/or the alert generator 124 using an operating system (e.g., Windows, OS X, iOS, Android, Linux, Unix, GNU, and the like). In some cases, the memory devices 132 of may be communicatively coupled to the one or more processors 130, such as via a data bus. The one or more memory devices 130 may be used to store any desired information, such as the aforementioned algorithm, a lookup table, computer executable instructions to implement the business rules for redacting and/or tokenizing electronic documents, and/or the like. The one or more memory devices 132 may be any suitable type of storage device including, but not limited to, RAM, ROM, EPROM, flash memory, a hard drive, and the like. In some cases, the one or more processors 130 may store information within the one or more memory devices 132, and may subsequently retrieve the stored information.

In some cases, the reversible data redaction and/or tokenization computing system 110 may include a communication interface 134 for exchanging data with one or more different computing devices and/or computing systems via a wired and/or wireless link 102. Such data may include electronic documents stored in a data repository database 144, a link to an electronic document stored in the data repository database 144, one or more business rules for analyzing the electronic documents, a link to computer executable instructions stored in the rules repository databases 142, 152, and 162 for analyzing the electronic documents, recipient information, sender information, and/or the like. The communication interface 134 depicted in FIG. 1 may include an interface to a local area network (LAN) and/or a wide area network (WAN), but may also include other network interfaces. When used in a LAN networking environment, the reversible data redaction and/or tokenization computing system 110 may be connected to the LAN through a network interface or an adapter that may be included as a portion of the communication interface. When used in a WAN networking environment, the reversible data redaction and/or tokenization computing system 110 may include a modem and/or other means for establishing wired and/or wireless communications over the WAN, such as the Internet. It will be appreciated that the network connections discussed are illustrative and other means of establishing a communications link between the reversible data redaction and/or tokenization computing system 110 and the computing systems 140, 150, 160, 170, and 180 may be used. The existence of any of various protocols such as TCP/IP, Ethernet, FTP, HTTP and the like is presumed. In some cases, one or more of the data redaction engine 114, the file analysis engine 116, the learning engine 118, and/or the alert generator 124 may be optionally hosted remotely from the reversible data redaction and/or tokenization computing system 110. In such cases, t the reversible data redaction and/or tokenization computing system 110 may be operated in a client-server configuration to permit a user to optionally retrieve web pages from a web-based server.

In some cases, the reversible data redaction and/or tokenization computing system 110 may include other inputs and/or outputs (I/O). The I/O may include a data port (e.g., a wireless port) that may be configured for communication using a protocol, such as a Bluetooth™, Wi-Fi 33, Zigbee or any other wireless protocol. In other cases, data port may be a wired port such as a serial port, an ARCNET port, a parallel port, a serial port, a CAT5 port, a USB (universal serial bus) port, and/or the like. In some cases, the data port of the I/O may use one or more communication protocols, such as Ethernet, and the like, that may be used via a wired network or a wireless network. In some instances, the I/O may include a USB port and may be used to download and/or upload information from a USB flash drive or some other data source. Other remote devices may also be employed, as desired.

The I/O may be configured to communicate with the one or more processors 130 and may, if desired, be used to upload information for use by the one or more processors 130 and/or download information from the one or more processors 130. Information that can be uploaded and/or downloaded may include, for example, values of operating parameters, configurations, business rules, documents, lookup tables, and the like. In some instances, the I/O may be used to upload a previously-created redacted and/or tokenized documents, and/or computer executable instructions for implementing one or more business rules for use in redacting and/or tokenizing document information thereby hastening the redaction and/or tokenization process. In some cases, the I/O may be used to download data stored within the memory devices 132. For example, the I/O may be used to download a redacted or tokenized document as generated by the reversible data redaction and/or tokenization computing system 110. The generated redacted and/or tokenized documents, or other information may be downloaded to a device such as a USB memory stick (also sometimes referred to as a thumb drive or jump drive), a personal computer, laptop, tablet computer, a PDA, a smart phone, or other device, as desired. In some cases, the data may optionally be convertible to a spreadsheet format, a text document format, plain text format, an XML file, and/or published document format file.

In the illustrative embodiment of FIG. 1 the user interface 126 may be a user interface device that permits the reversible data redaction and/or tokenization computing system 110 to display and/or solicit information, as well as accept one or more user interactions with a user. For example, the user interface 126 may permit a user to enter data that may be redacted from a document or data that may be used in place of text in the electronic document, and the like. In some cases, the user interface 126 may include a display and a distinct keypad. In some cases, the user interface 126 may include a display and a virtual keypad. A display may be any suitable display. In some instances, the display may include or may be a liquid crystal display (LCD), and in some cases a fixed segment display or a dot matrix LCD display. If desired, user interface 126 may be a touch screen LCD panel that functions as both display and keypad. In some instances, a touch screen LCD panel may be adapted to solicit information from a user and/or to receive such information. The user interface 126 may be adapted to display one or more user interface screens 128. For example, the reversible data redaction and/or tokenization computing system 110 may be configured to solicit and/or present information to a user via the one or more use interface screens 128, such as by displaying a proposed redacted and/or tokenized document for review, displaying an alert regarding an error generated during the tokenization and/or redaction process, and/or the like.

In some cases a data obfuscation engine (e.g., the data tokenization engine 112, the data redaction engine 114, the file analysis engine 116, the learning engine 118, and/or the alert generator 124, and the like) may be specially programmed to allow data in documents and/or otherwise associated with the documents (e.g., meta-data, a file header, a file type, and the like) to be altered, redacted or summarized in such a way that the resulting document still captures the essence of the original file and/or document. In some cases, this modification may be performed by analyzing the electronic document to identify non-public information, and obfuscating (e.g., covering, removing, pixelating, and the like) the identified non-public information to redact the subject matter from the document. In some cases, the modification may be performed by replacing the non-public information with generic information of a similar format (e.g., nnn-nn-nnn and the like). In some cases, the non-public information may be redacted and/or modified by including a summary of the non-public information that may be viewed by individuals not allowed to view the non-public information.

In some cases, the reversible data redaction and/or tokenization computing system 110 may access electronic data stored in one or more databases. The electronic data may refer to any type of document including, but not limited to a text document (e.g., a word processing file), a spreadsheet document, a presentation slide deck, an image file, a picture file (e.g., a .jpeg file, a .gif file, a .tiff file, and the like), free form, structured data, tree form, and the like. In some cases, the data may include meta-data associated with the one or more files stored in the database, such as, but not limited to, an author name, a file creation date and/or time, a file edit date and/or time, a file size, an associated program, footnotes, endnotes, editing markups, security options, an organization name, an organization department, a keyword list, hyperlinks, a total editing time, a printed on date, document statistics, image statistics, an email address, a telephone number, a client name, a checked by filed, a destination field, a disposition field, a program version, a save location, a subject field, a title field, copyright information, a format field, a profile type, a last opened field, a camera device type, a camera device maker, dimension information, resolution information, exchangeable image file (EXIF) information, geographic location information, sharing information, public key information, email header information, and/or the like.

Originally redaction of documents was a manual process, where sensitive or non-public information included in a printed document was marked, in many cases with black ink, to cross out any portions of the document that were meant to be hidden, such as account numbers and/or the like. Disadvantages with such redaction procedures is that the process is manual, potentially labor intensive for large document, and dependent on the individuals doing the redaction not making errors. Further, such redactions are often not reversible. With electronically stored documents, text documents can often be opened with text editing software, the data may be modified by a user and then saved. The changes to the document are oftentimes lost, if an older version of the document is not available or remembered. Further, in some cases, some documents may be read-only documents, such as a .pdf file, such read-only documents are not editable, so that the document may not be able to be edited, even within the program used to create the document. The systems and methods discussed herein allow for redaction and/or tokenization to be done on a wide range of documents, image files, and/or the like. For example, by automating the redaction and/or tokenization process, a computing device, such as the reversible data redaction and/or tokenization computing system 110, may be specially configured to monitor communications of files between internal business departments or between an employee of the business organization and an outside individual. Here, the reversible data redaction and/or tokenization computing system 110 may detect a file being communicated between the source computer device and a client device that may be located external to the business organization. In such cases, for example, the reversible data redaction and/or tokenization computing system 110 may capture the file being communicated and analyze the contents of the document, apply one or more filters and redact data (e.g., an account number) or otherwise change the data (e.g., tokenize). Unlike other current computing systems designed to manage the flow of information, the reversible data redaction and/or tokenization computing system 110 may allow a business organization to proactively manage the amount of non-public information accidentally communicated by the business organization by monitoring any or all communications and applying one or more filters to catch and or modify the non-public information before the communication has been sent rather than monitoring data only upon the identification of a data leakage event.

The reversible data redaction and/or tokenization computing system 110 may allow noise and/or other data content to be included into the document to redact, obfuscate, tokenize or otherwise modify portions of the document. For example, the data tokenization engine 112 may allow the reversible data redaction and/or tokenization computing system 110 to "encrypt" a document, or a portion of a document, using a key. This key may be required to descramble to content of the document. In an illustrative example, an individual may be required to sign a document, where the document may include personal or non-public information. The recipient of the document may also have the tokenization key. This key may then be used to descramble any tokenized portion of the document.

For example, a business organization may communicate a document to an individual for a signature, where the document may include personal non-public information such as a social security number and/or an account number. Before sending the document to the individual, the data tokenization engine 112 may analyze the document to identify the non-public information and may selectively encrypt (e.g., tokenize) only the non-public information, wherein the recipient may descramble these portions using an associated tokenization key, review the complete document before signing, and re-tokenize the document to securely send back the signed document back to the business organization.

As discussed above, one or more business units and/or information security organizations associated with a business organization may define certain business rules and/or regulatory rules to preserve data security to ensure proper handling of sensitive personal and/or non-public information. For example, each business unit may have an associated computing system, such as the computing systems 140, 150, and 160. These business units may define one or more data parameter fields and/or filters to ensure proper data security measures. For example, the business organization may have account numbers having a certain number of digits (e.g., a 5 digit account number, a 6 digit account number, and the like) and/or having a certain mix of alphanumeric characters. As such, the business unit may define one or more business rules to ensure that such information, or other such non-public information (e.g., a name, a social security number, an address, and/or the like) may not be included in a communicated document. As such, the rules repository databases 142, 152, and 162 may include computer executable instructions that allow a computing device to apply the defined business or governmental rules. These rules 122 may be stored locally to the business unit and/or may be included in the rules repository database 120 for use by the reversible data redaction and/or tokenization computing system 110. These rules 122 may be static rules that will not change, such as a rule to identify a social security number in its three digit-two digit-four digit format. In other cases, the rules may be adapted as the business practices change, such as when a business organization changes a format of an account number from 5 digits to 7 digits, or from a numeric-only account number to an account number having a mix of alphanumeric characters. These rules 122 may apply to data visible within the document, such as the document text and/or a visible image. These rules 122 may also apply to non-visible data associated with the document, such as a document header or metadata associated with the document.

In many cases, the reversible data redaction and/or tokenization computing system 110 may be configured to link to multiple filters of different business units, may determine a priority of rules to apply, and may have the ability to adapt existing rules to previously unknown data formats, such as by the learning engine 118. For example, a business unit may process medical records that may be subject to one or more governmental privacy regulations (e.g., health insurance portability and accountability act regulations and the like) and may include one or more rules for ensuring proper handling of such non-public information. The learning engine 118 may be configured to analyze each document being processed by the reversible data redaction and/or tokenization computing system 110 using rules not previously used with documents of that type, from a particular source, and/or being communicated to a particular destination. As such, the learning engine 118 may then learn to link a rule stored in a first data repository 142 and/or associated with a first business unit computing system 140 with document stored in a document database 154 associated with a different computing system 150. Further, when new rules or rule combinations have been identified by the learning engine 118, the learning engine may trigger the alert generator 124 to generate an alert indicating the newly learned rule.

In some cases, the data tokenization engine 112 and/or the data redaction engine 114 may be configured to one or more business rules stored in the rules repository databases 120, 142, 152, and 162 in analyzing documents 145 that may be stored in one or more of the document databases 144, 154, and 164. In other cases, one or more documents may be communicated via the network 105 to the reversible data redaction and/or tokenization computing system 110 for analysis, redaction and/or tokenization purposes. In some cases, the reversible data redaction and/or tokenization computing system 110 and/or components of the reversible data redaction and/or tokenization computing system 110 may be implemented at a central location, such as in a central server, server farm and/or as a cloud service. In other cases, portions of the reversible data redaction and/or tokenization computing system 110 may be implemented locally to different ones of the internal computing systems 140, 150, and 160. In doing so, the business organization may ensure proper handling of sensitive information in documents in communications between employees and third parties or even between employees within the business organization. In many cases, the reversible data redaction and/or tokenization computing system 110, or other portions of the computing system 100, may include an alert generator 124 that may be configured to monitor handling of documents within the business organization's computer network and issue an alert when sensitive information may be, or may have been, communicated without being redacted and/or tokenized. For example, the alert generator 124 may be configured to send an alerting email, text message, instant message, or otherwise issue an alert to a responsible party that a communication may have included a document having one or more sections of non-public data that has not been redacted and/or tokenized. In other cases, the alert generator 124 may be configured to send an alerting message (e.g., an email, a text message, a physical letter, a printout, a fax message, an instant message, and the like) when the reversible data redaction and/or tokenization computing system 110, the data tokenization engine 112, and/or the data redaction engine 114 has automatically redacted and/or tokenized any identified personal or otherwise non-public information in the communicated document before the document had been sent. In some cases, the alert generator 124 may be configured to detect an unknown data format, such as an account number having an unknown format (e.g., 6 characters rather than 5 characters) within a document being analyzed, and issue an alert identifying the unknown data format to a responsible party. By doing so, the reversible data redaction and/or tokenization computing system 110 may be configured to automatically prevent accidental disclosure of non-public information when an unknown format had been used and/or if an error had been made when entering the non-public information into the document.

In some cases, the data tokenization engine 112 and/or the data redaction engine 114 may process instructions to generate a "layered" implementation that may allow for "split-level" hiding, such that no single person, or business unit, may know all information that may have been obfuscated and/or redacted. In some cases, the data tokenization engine 112 and/or the data redaction engine 114 may generate one or more data obfuscation layers that may be overlaid on a document. For example, a first obfuscation layer may be used to hide a first portion of the document (e.g., account numbers) from a first set of users. A second obfuscation layer may be generated to hide a second portion of the document from a second set of users. In some cases, these layers may be combined into a single layer, where the first set of users may be assigned a first tokenization key associated with a first set of tokenized information and the second set of users may be assigned a second tokenization key associated with a second set of tokenized information.

In some cases, the data tokenization engine 112 and/or the data redaction engine 114 may process computer executable instructions to split a document so that no one person sees the full document. For example, the document may be split and communicated between two or more different communication paths and/or may be stored in two or more different document database, so that if one of the split documents is intercepted by an unintended recipient, this individual will not have access to the full document, even if the tokenization key has been broken.

In some cases, the data tokenization engine 112 may analyze one or more documents using filters 122 stored in the rules repository 120, 142, 152, and/or 162 and may be configured to provide random and/or event-based obfuscation (e.g., scrambling). For example, the data tokenization engine 112 may be configured analyze documents using a randomly generated tokenization key. In some cases, the tokenization key may be generated based on a particular day and/or a particular day of the week, or based on a particular event. The data tokenization engine 112 may be configured to store a key, along with the tokenized document, so that when and/or if a user communicates a document back to the data redaction and/or tokenization computing system 110, the data tokenization engine 112 may be able to unscramble to non-public information. In some cases, the data tokenization engine 112 may be configured to provide a unique key to one or more individuals and/or business units so that no single person may be able to unscramble all tokenized information. In some cases, the information that had been tokenized may be identifiable to one or more individuals viewing the tokenized documents. For example, the characters of the tokenized information may be randomly generated based on the tokenization key. In other cases, the tokenized data may look to be non-public information, but may actually not be associated with any individual, as indicated in the examples below.

In an illustrative example, the data analysis engine 116 may process computer executable instructions to apply one or more rules 112 in tokenizing or otherwise obfuscating information. For example, the data analysis engine 116 may analyze the document to identify one or more names included in the document. The data tokenization engine 112 may then apply one or more rules to tokenize or otherwise obfuscate the information. In some cases, the data tokenization engine 112 may process one or more business rules 122 to change a first name (e.g., <name_1>) to a second name (e.g., <name_2>) when a person's real name is not desired to be made public. In another case, an identification number may be modified to be in a similar format, but may be changed to a different number combination that may be outside the currently active lists. In other cases, an identification number may be replaced with letters (e.g., xxx-xx-xxxx). In some cases, an individual's address may be changed from a first address (e.g., <address_1> to a second address <e.g., <address_2>. In another example, the data tokenization engine 112 may be configured to detect a regionally identifiable name and/or a gender-identifiable name and the like. Such names may then be obfuscated with a name replacement (e.g., <name> placeholder) and/or with a different name that may be regionally and/or be gender neutral. In an illustrative example, a human resources department may desire to minimize first impression based on names, and allow an individual's skills be used as the individual's introduction to the hiring manager.

In many cases, the data tokenization engine 112 and/or data redaction engine 114 may be configured to preserve the format of the original document after obfuscating the data. In doing so, the data redaction and/or tokenization computing system 110 allows for more efficient communication of information as the recipient is not required to use specialized software to view the tokenized and/or redacted documents. Further, by sending a tokenized and/or redacted document in a similar format to the original document, the document may useless to any unintended viewer of the document. For example, without the proper knowledge of which data, and with what method, the unintended recipient may not identify which information is valuable and which had been obfuscated. In tokenizing and/or redacting information from the documents using plausible information, the tokenized and/or redacted documents may not look to be encrypted.

Once the data tokenization engine 112 and/or the data redaction engine 114 have tokenized and/or redacted the information, the data redaction and/or tokenization computing system 110 may communicate the redacted and/or tokenized document(s) to the intended recipient, such as via the external computing system 180 and/or an internal computing system 170.

The ability of the data tokenization engine 112 and the data redaction engine 114 to reverse tokenization and/or redaction of documents also allows for greater traceability of changes to the documents over the life cycle of the document. For example, the data tokenization engine 112 may store an indication that a word at line 4, word 7 had been tokenized on a first day and that that particular work had been re-tokenized or reversed at a second day. This information may be stored as a data redaction flag or data tokenization flag (e.g., 1=redacted/tokenized and 0=original format). In some cases, further information may be stored with the device, such as the location of the one or more obfuscated words within the document. This information may be stored in the document databases separate from the document. In other cases, this information may be stored with the document, such as metadata. Further this traceability allows the data redaction and/or tokenization computing system 110 to revert or otherwise restore documents that had been tokenized or redacted, such as by using a reverse-compilation using the one or more rules 122. In some cases, a document may not be desired to be reversed. In such cases, the original document may be destroyed and only the redacted document may be stored (e.g., storing a document on the cloud). In some cases, the data redaction and/or tokenization computing system 110 may include an ability to lift or alter layers to eliminate certain metadata associated with the document. For example, the file analysis engine 116 may process instructions to analyze the metadata associated with the documents. Learning engine 118 may also learn, such as by monitoring the file analysis engine, that which document formats may be associated with metadata that may be desired to be redacted and/or tokenized. For example, the data tokenization engine 112 and/or the data redaction engine may be configured to redact or tokenize properties of the document, such as an edit date, a save date, an author name, an address, and/or the like.

Further, this ability may also apply to tokenizing and/or redacting data headers. For example, a header of a document may identify an associated program for use in viewing the document. By obfuscating the header information, the true nature of the document may be hidden. As such, an unintended recipient of a redacted and/or tokenized image document may be looking for image files, but a redacted and/or tokenized document may indicate that the document is a text file or other non-image file, which may not be of any interest to the unintended recipient.

In some cases, the data redaction and/or tokenization computing system 110 may be configured to selectively redact and /or tokenize portions of the same document. For example, certain portions of a particular document may be redacted, while other information, (e.g., names, and/or account numbers) may be tokenized or redacted. In some cases, redacting a document may comprise a "brute-force" method of removing non-public information from a document. However, tokenization may be more controlled. For example, in some cases, tokenization may allow the data redaction and/or tokenization computing system 110 to hide data. For example, a business unit desires to send a document to a vendor, but the document contains non-public information. The data redaction engine may apply one or more rules to redact the non-public information and then forward the document to the intended recipient (e.g., the external computing system 180). In an illustrative example, the data redaction and/or tokenization computing system 110 may process the document using filters to add extra characters in line with one or more rules stored in the rules repository database 142, 152, and/or 162 to change a header and/or to change the content of the document file. In doing so, the document may be changed enough that only the desired recipient may determine that the document includes the hidden information. In another example, the data redaction and/or tokenization computing system 110 may change a data format. In an illustrative example, the business unit desires to send a document to an outside recipient (e.g., a vendor). The data redaction engine 114 may process the document to convert identification numbers to a specified data format (e.g., NNN-NN-NNNN), where all identification numbers in the document may be converted to this format.

The data redaction and/or tokenization computing system 110 allows for faster delivery times of scrubbed (e.g., obfuscated and/or redacted) documents.

Figure 2:
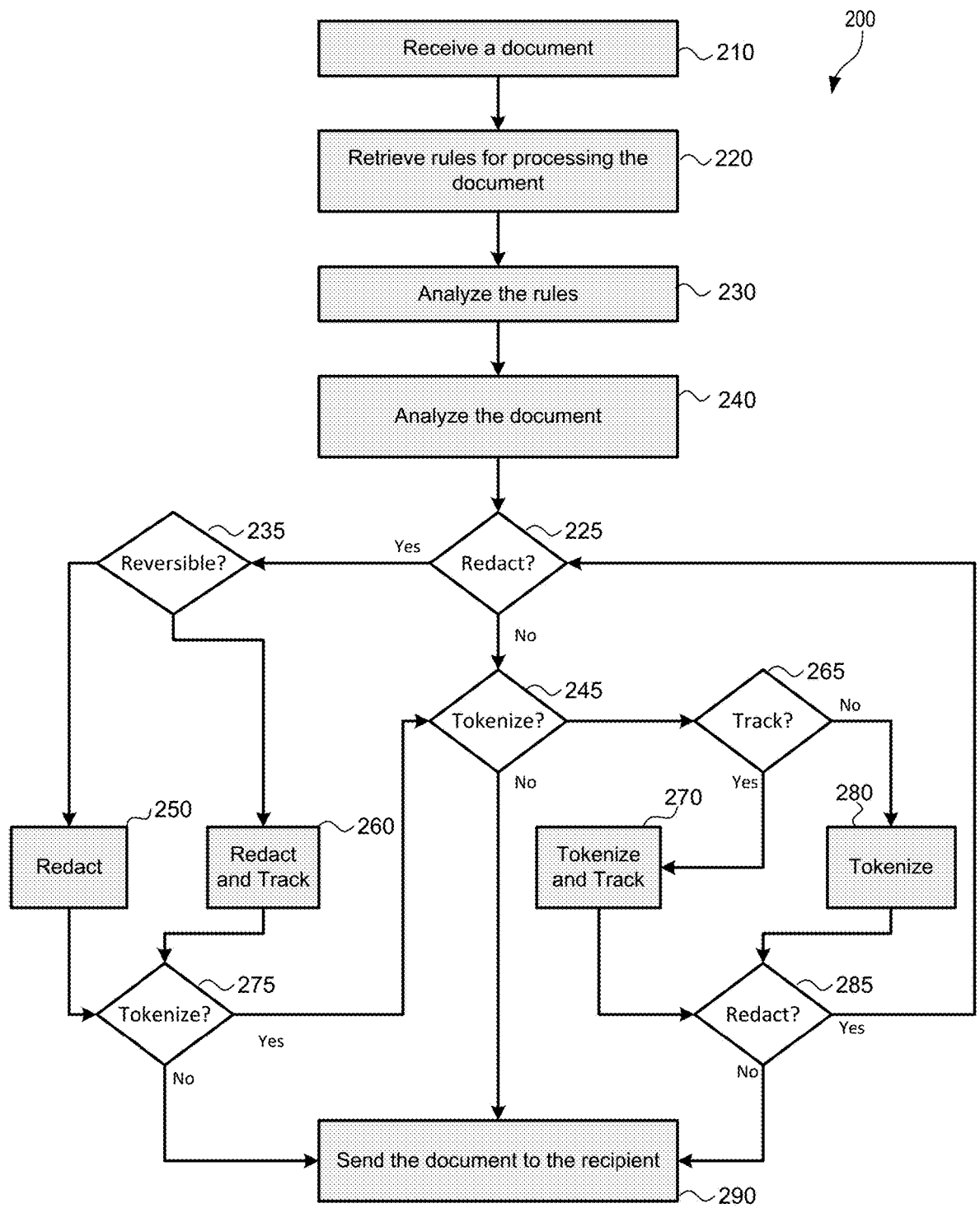
FIG. 2 shows an illustrative method for redacting an illustrative document according to one or more aspects of the present disclosure.

FIG. 2 shows an illustrative method 200 of analyzing documents and rules to selectively redact and/or tokenize a document according to aspects of this disclosure. At 210, the data redaction and/or tokenization computing system 110 may receive a document via the network 105 from one or more document databases 144, 154, or 164. The document may be desired to be sent to a recipient at a computing system external to the business organization or to a recipient associated with the business organization. At 220, one or more business rules may be retrieved by the data redaction and/or tokenization computing system 110 to be used in selectively redacting and/or tokenizing one or more portions of the document. At 230, the rules may be analyzed by the analysis engine 116 to determine whether to tokenize and/or redact one or more portions of the document. At 240, the analysis engine 116 may analyze the document based, at least in part, on the business rules to determine whether to redact and/or tokenize portions of the document. In some cases, the analysis engine may analyze the document based on a destination and/or a source associated with the document.

At 225, the analysis engine may determine whether to redact the document based on the analysis. If so, the data redaction and/or tokenization computing system 110 may determine whether the redaction is to be reversible at 235. If so, the data redaction engine 114 may redact one or more portions of the document based on the rules analysis at 260. In doing so, the portions of the document that have been redacted may be tracked. For example, a flag indicative of whether the document has been redacted may be set. In some cases, information regarding the location and/or data redacted may be stored in another database for future reference when undoing the redaction process. Returning to 235, if the redaction is not to be reversible, the data redaction engine may redact the data based on the rules at 250. After the document was redacted at 250 and/or redacted and tracked at 260, the data redaction and/or tokenization computing system 110 may determine whether the document is to be tokenized as well. If not, the redacted document is sent to the recipient at 290. Otherwise, the redacted document is processed by the data redaction and/or tokenization computing system 110 at 245.

Returning to 225, if the document is not to be redacted, the data redaction and/or tokenization computing system 110 may determine whether the document is to be tokenized. At 245. If not, the document may not include any non-public information and no redaction or tokenization may be desired, and the document may be sent to the recipient at 290. Returning to 245, if the data redaction and/or tokenization computing system 110 is to tokenize the document, the data redaction and/or tokenization computing system 110 may also determine whether the tokenization is to be tracked at 265. If so, the data redaction and/or tokenization computing system 110 may tokenize the document based, at least in part on the rules (e.g., computer executable instructions) retrieved from the rules repository at 270. The data redaction and/or tokenization computing system 110 may also set a flag indicative that the document has been tokenized. Further, the location within the document (e.g., a line and word location, a pixel count, and the like), may be stored in a database to identify a location of the redacted information. Returning to 265, if the data redaction and/or tokenization computing system 110 is not to track the tokenization of the document, the data redaction and/or tokenization computing system 110 tokenizes the non-public information in the document based on the rules, at 280. At 285, the data redaction and/or tokenization computing system 110 may determine whether or not to redact the tokenized document. If not, the tokenized document is communicated to the intended recipient at 290. If so, the data redaction and/or tokenization computing system 110 may determine whether or not to redact a portion of the electronic document at 225.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A reversible data redaction system, comprising:
a first computing system comprising a first database storing a plurality of electronic documents;
a second computing system including a second database storing a plurality of computer executable instructions for applying one or more rules in relation to managing non-public information in electronic documents;
a reversible data redaction engine comprising a processor and a non-transitory memory device, the non-transitory memory device storing instructions that, when executed by the processor, cause the reversible data redaction engine to:
monitor communications sent over a network;
identify, based on the monitored communications, an electronic document being communicated from a source computing device to a destination computing device over the network;
analyze the electronic document to determine a document type, the source computing device of the electronic document, and a destination to which the electronic document is to be communicated;
redact at least a portion of the electronic document by executing the computer executable instructions to apply the one or more rules based on at least one of the document type, the source computing device, or the destination of the electronic document, wherein a first redacted portion is for presentation to a first recipient and a second redacted portion is for presentation to a second recipient; and
split the electronic document into the first redacted portion and the second redacted portion, wherein the first redacted portion is for communication via a first network to a first recipient and the second redacted portion is for communication via a second network to a second recipient.

2. The reversible data redaction system of claim 1, wherein the first database stores electronic versions of one or more text documents, spreadsheet documents, image documents, presentation slide decks, and electronic communications.

3. The reversible data redaction system of claim 1, wherein the electronic documents stored in the first database comprise meta-data and wherein the computer executable instructions stored in the second database include rules for redacting at least a portion of the meta-data of the electronic documents.

4. The reversible data redaction system of claim 1, further comprising a network, wherein the non-transitory memory devices further store instructions that, when executed by the processor, cause the reversible data redaction engine to receive, via the network, a pointer to the electronic document stored in the first database.

5. The reversible data redaction system of claim 1, wherein the non-transitory memory devices further store instructions that, when executed by the processor, cause the reversible data redaction engine to:
perform a textual analysis of contents of the electronic document based on one or more applied business rules;
identify one or more portions of the electronic document that include non-public information; and
redact the one or more portions of the electronic document that have been identified to include non-public information.

6. The reversible data redaction system of claim 5, wherein redaction comprises removal of the non-public information from the electronic document.

7. The reversible data redaction system of claim 5, wherein the redaction comprises obscuring at least the non-public information to ensure the non-public information is not available to viewers of the electronic document.

8. The reversible data redaction system of claim 1, wherein the non-transitory memory devices further store instructions that, when executed by the processor, cause the reversible data redaction engine to:
perform a textual analysis of meta-data associated with the electronic document based on one or more applied business rules;
identify one or more portions of the electronic document that include non-public information; and
redact the one or more portions of the meta-data of the electronic document that have been identified to include non-public information.

9. The reversible data redaction system of claim 1, wherein the non-transitory memory devices further store instructions that, when executed by the processor, cause the reversible data redaction engine to:
perform an image analysis of the electronic document based on one or more applied business rules;
identify one or more portions of images included in the electronic document that have been determined to include non-public information; and
redact the one or more portions of the images of the electronic document that have been identified to include non-public information.

10. The reversible data redaction system of claim 1, wherein the instructions that cause the reversible data redaction engine to redact at least a portion of the electronic document by executing the computer executable instructions to apply one or more business rules based on at least one of the document type, the source of the electronic document, or the destination of the electronic document, further cause the reversible data redaction engine to generate a redaction layer that is to overlay the electronic document and obscure any identified non-public information within the electronic document.

11. The reversible data redaction system of claim 1, wherein the non-transitory memory devices further store instructions that, when executed by the processor, cause the reversible data redaction engine to:
save, in the first database, a redaction indicator when the electronic document has been redacted, wherein the redaction indicator comprises at least one of a redaction flag and an indication of which portion of the electronic document has been redacted.

12. The reversible data redaction system of claim 1, wherein the non-transitory memory devices further store instructions that, when executed by the processor, cause the reversible data redaction engine to:
receive a command to reverse a redaction of at least a portion of the electronic document; and
remove any redaction marks that had been added to the electronic document to obscure non-public information identified based on the computer executable instructions stored in the second database.

13. The reversible data redaction system of claim 1, wherein the non-transitory memory devices further store instructions that, when executed by the processor, cause the reversible data redaction engine to:
analyze the electronic document based using the computer executable instructions retrieved from the second database, wherein the computer executable instructions further comprise instructions for identifying information corresponding to non-public information in the electronic document; and replace, within the electronic document, the identified information that includes references to non-public information by modifying at least one of a textual passage including the non-public information, an image including the non-public information, and meta-data including the non-public information.

14. The reversible data redaction system of claim 1, wherein the non-transitory memory devices further store instructions that, when executed by the processor, cause the reversible data redaction engine to:

save, in the first database, a tokenization indicator when at least a portion of the electronic document has been replaced, wherein the tokenization indicator comprises at least one of a tokenization flag and an indication of which portion of the electronic document has been replaced.

15. A reversible data redaction computing device, comprising:

a processor; and a non-transitory memory device, the non-transitory memory device storing instructions that, when executed by the processor, cause the reversible data redaction computing device to:

monitor communications on a network;

identify, based on monitored communications, an electronic document being communicated from a source computing device to a destination computing device over the network;

analyze the electronic document to determine a document type, a source of the electronic document, and a destination to which the electronic document is to be communicated;

retrieve, from a first database and based on a determined document type, source of the document or a destination to which the electronic document is to be communicated, computer executable instructions for identifying and redacting non-public information identified in the electronic document;

redact at least a portion of the electronic document by executing the computer executable instructions based on at least one of the document type, the source of the electronic document, or the destination of the electronic document, wherein a first redacted portion is for presentation to a first individual and a second redacted portion is for presentation to a second individual; and split the electronic document into the first redacted portion and the second redacted portion, wherein the first redacted portion is for communication via a first network to a first recipient and the second redacted portion is for communication via a second network to a second recipient.

16. The reversible data redaction computing device of claim 15, wherein the instructions, when executed by the processor, cause the reversible data redaction computing device to:

store, in a second database, a redacted version of the electronic document as a new document.

17. The reversible data redaction computing device of claim 15, wherein the instructions, when executed by the processor, cause the reversible data redaction computing device to:

store, in a second database, a new electronic document comprising redactions to the original electronic document, wherein a combination of the new electronic document and the original electronic document comprises a redacted version of the electronic document.

18. The reversible data redaction computing device of claim 15, wherein the instructions, when executed by the processor, cause the reversible data redaction computing device to:

receive a command to reverse a redaction of at least a portion of the electronic document; and remove one or more redaction indicators that had been added to the electronic document to obscure non-public information identified based on the computer executable instructions stored in a second database.

19. A method of reversibly redacting an electronic document, the method comprising:

monitoring communications on a network;

identifying, based on the monitored communications, an electronic document being communicated from a source computing device to a destination computing device over the network;

analyzing, by an analysis engine of the document redaction computing device, the electronic document to determine at least one of a document type, a source of the electronic document, and a destination to which the electronic document is to be communicated;

retrieving, by the document redaction computing device, computer executable instructions stored in a first database wherein the computer executable instructions cause the document redaction computing device to identify and redacting non-public information identified in the electronic document based on a determined document type, source of the document or a destination to which the electronic document is to be communicated; and identifying, by the document redaction computing device, non-public information within the electronic document by processing the computer executable instructions retrieved from the first database; and redacting, at least a portion of the identified non-public information of the electronic document by executing the computer executable instructions based on at least one of the document type, the source of the electronic document, or the destination of the electronic document, wherein a first redacted portion is for presentation to a first individual and a second redacted portion is for presentation to a second individual; and splitting the electronic document into the first redacted portion and the second redacted portion, wherein the first redacted portion is for communication via a first network to a first recipient and the second redacted portion is for communication via a second network to a second recipient.

20. The method reversibly redacting an electronic document of claim 19, comprising:

receiving, at the document redaction computing device, a command to reverse a redaction of at least a portion of the electronic document; and removing one or more redaction indicators that had been added to the electronic document to obscure non-public information identified based on the computer executable instructions stored in a second database; and saving, by the document redaction computing device, the electronic document in a second database.

* * * * *